3,333,288
SURFACE TREATING APPLIANCE
Brandt F. Ziegler, North Canton, Ohio, assignor to The Hoover Company, North Canton, Ohio, a corporation of Ohio
Filed Feb. 15, 1965, Ser. No. 432,764
3 Claims. (Cl. 15—50)

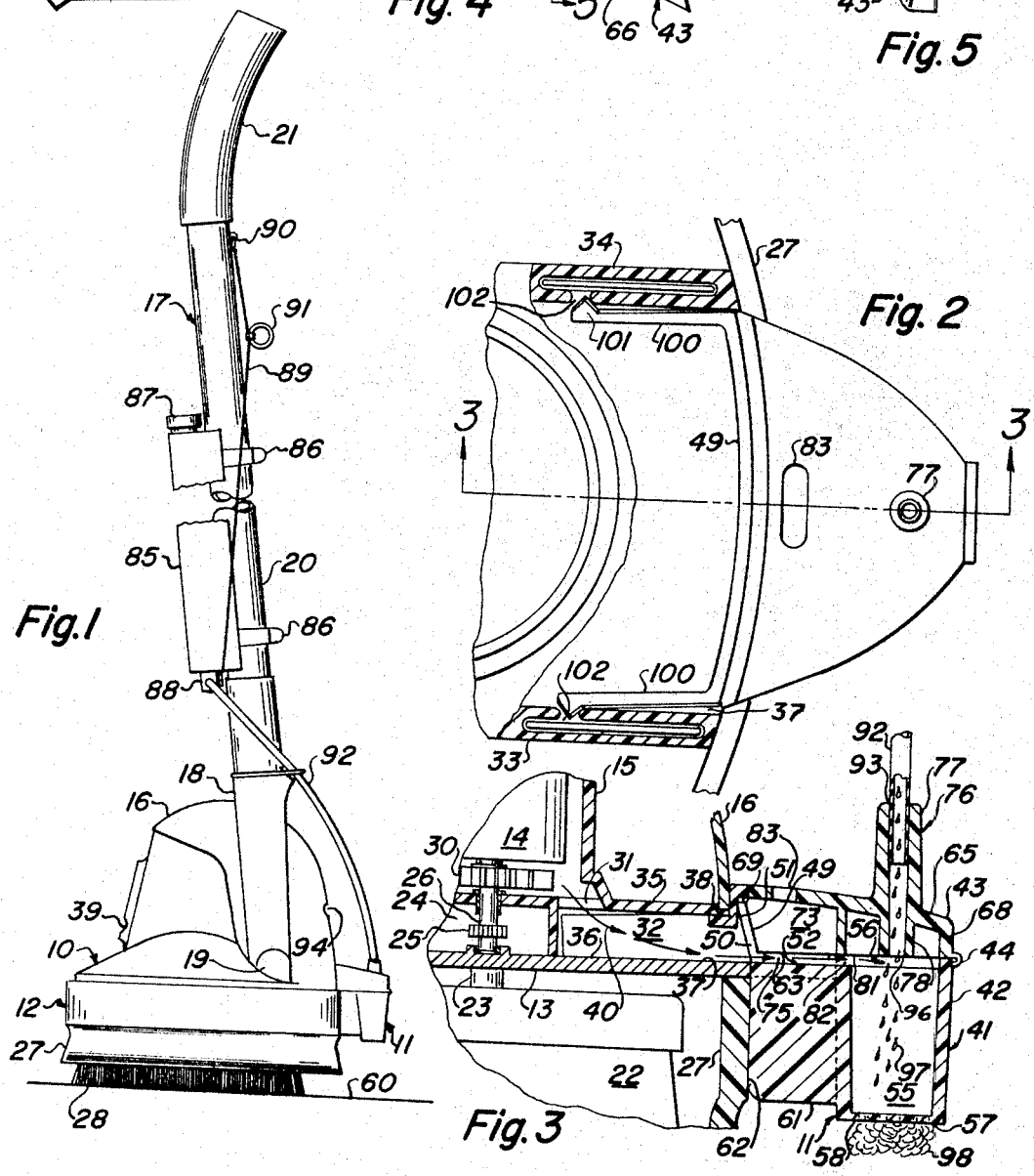

The present invention relates to an appliance for treating surfaces and more particularly to aerating material into a foamy condition prior to aplying the material on a surface to be treated.

An object of the invention is to provide a surface treating appliance which supplies air to a material to aerate the latter prior to discharging the material onto the surface to be treated. Another object is to employ the exhaust air stream of a motor in an appliance to aerate material into a foamy condition prior to discharging the material onto the surface to be treated. A further object is to provide a dispenser removably attachable to a surface treating appliance and employ the air discharged from the motor to aerate material into a foamy condition prior to dispensing it onto the surface being treated. Other objects and advantages of the invention will become apparent from the folowing description and drawing, wherein:

FIGURE 1 is a side elevation of the appliance with the dispenser portion attached, FIGURE 2 is a top view partly in section showing the structure for attaching the dispenser portion.

FIGURE 3 is a section along the line 3—3 in FIGURE 2,

FIGURE 4 is a top view of the dispenser portion with its cover moved to opened position, and FIGURE 5 is a section along the line 5—5 in FIGURE 4.

The embodiment of the invention herein disclosed comprises an appliance 10 having a rear body portion 11 and a front body portion 12 the latter provided with a base 13 on which is mounted a partially shown motor 14 positioned in a casing 15 enclosed in an appearance housing 16. A propelling handle 17 has at its lower end a bail 18 pivotally attached at 19 to the base 13, and extending from the bail 18 is a tubular handle portion 20 terminating in a handle grip 21. A pair of surface engaging brushes 22, only one of which is shown, are arranged in side-by-side relation beneath the base 13 in a conventional manner and each has a shaft 23 projecting upwardly into a gear casing 24 and is provided with an unshown gear driven by a gear 25 on the motor shaft 26. A furniture guard 27 is attached to the base 13 and encircles the latter and the brushes 22, however a portion 28 of the brush bristles project below the furniture guard for engagement with the surface to be treated.

A fan 30 is mounted on the motor shaft 26 and is arranged in the motor casing 15 beneath the motor 14. The motor casing 15 adjacent the fan 30 has an aperture 31 leading to an air passageway 32 defined by spaced side walls 33 and 34, an upper wall 35 and a portion 36 of the base 13. The air passageway 32 terminates in an exhaust outlet 37 and the appearance housing 16 is recessed at 38 upwardly of the base 13 so as not to obstruct the outlet 37. An aperture 39 is provided in the front wall of the appearance housing 16 for passage of motor cooling air into the unshown open top of the motor casing 15 and downwardly over the motor 14 to the fan 30 and the latter expels the air through the aperture 31, passageway 32 and outlet 37 as shown by the arrows 40 to cool the motor 14.

Forming part of the appliance is a dispenser 41 which comprises the rear body portion 11 formed of molded plastic including a lower section 42 and an upper section 43 joined together by a molded plastic hinge 44. The lower section 42 has a bottom wall 45 from which upwardly projects arcuate side walls 46 and 47 terminating at the end wall 48 adjacent the hinge 44. The other end wall 49 projects upwardly from the bottom wall 45 between the side walls 46 and 47 and is provided with an elongated air inlet 50 having an upper defining edge 51 and a lower edge 52 defined by the upper surface of the bottom wall 45. The air inlet 50 is positioned in the end wall 49 from the side wall 46 to a point 53 from which a solid wall portion 54 extends to the other side wall 47. An elongated vertically disposed aerating chamber 55 depends from the bottom wall 45 in which is an entrance 56 to the chamber 55. The lower wall 57 of the aerating chamber 55 has an outlet 58 formed by a plurality of molded perforations 59 for discharge of material onto the surface 60 to be treated. Projecting from the chamber 55 is a rib 61 having an edge 62 which engages the furniture guard 27. A rib 63 projects upwardly from the bottom wall 45 and extends from the point 53 at one end of the air inlet 50 to a point 64 adjacent the entrance 56 to the aerating chamber 55.

Projecting integrally from the opposite ends of the end wall 49 is a molded plastic resilient arm 100 each provided with a lug 101 adapted to be seated in a recess 102 formed in each side wall 33 and 34 of the air passageway 32 as shown in FIGURE 2. The flexible arms 100 are biased outwardly and thus urge the lugs 101 into the recesses 102 to attach the rear body portion 11 to the front body portion 12.

The upper section 43 of the body portion 11 has a top wall 65 from which depends spaced arcuate side walls 66 and 67 terminating at the end wall 68 adjacent the hinge 44. The other end 69 of the top wall 65 has a pair of molded plastic tabs 70 which releasably engage the top defining wall 51 of the air inlet 50 to hold the top wall 65 in the closed position shown in FIGURE 3. The side walls 66 and 67 are each provided with a projecting flange 71 as shown in FIGURE 5 and which seat along the inner surface 72 of the lower side walls 46 and 47 when the top wall 65 is in closed position. The top wall 65 when in closed position provides a cover for the lower section 42 and also overlies the entrance 56 to the aerating chamber 55.

A rib 73 projects downwardly from the cover wall 65 and when the latter is in closed position the rib 73 abuts the lower rib 63 to form a partition extending from the point 53 of the air inlet 50 to the vicinity of the aerating chamber 55. When the cover or top wall 65 is closed it cooperates with the lower section 42 to form an air passageway 75 extending from the inlet 50 to the aerating chamber 55. The air passageway 75 is defined by the cooperating ribs 63–67, side walls 46–66 end walls 48–68, bottom wall 45 and cover 65.

Projecting from opposite faces of the cover 65 is a tubular member 76 having an outer portion 77 and an inner portion 78 the latter being arranged centrally above the aerating chamber 55, as shown in FIGURE 3, for dispensing material into the chamber. A four sided annular flange 79 defined by the three members 80 and the end wall 68 surrounds the inner tubular portion 78 and encloses an area around the entrance 56 to the aerating chamber 55. The lower edges 81 of the three members 80 are spaced upwardly from the bottom wall 45 to define a restriction 82 in the air passageway 75 around the entrance 56 to the aerating chamber 55. The restriction 82 serves to increase the velocity of the air stream in the passageway 75 flowing from the inlet 50 toward the entrance 56 of the aerating chamber 55.

In the cover 65 is an opening 83 for escape of air from the passageway 75 to atmosphere. In the event the opening 58 in the aerating chamber 55 becomes clogged the opening 83 in the cover 65 insures that air will escape from the passageway 75 to prevent overheating of the motor 14.

In order to store the material to be aerated an elongated container 85 is provided and has a pair of resilient clamps 86 to removably secure the container 85 to the tubular portion 20 of the handle 17. The upper end of the container 85 has a removable cap 87 and the lower end has a suitable normally closed unshown valve 88 to which is connected a cord 89 secured at its upper end by a hook 90 to the handle 17. A ring 91 on the cord 89 receives a finger of the operator for pulling the cord 89 to control operation of the valve 88 for dispensing material from the container 85. Extending from the valve 88 is a hose 92 having its lower end 93 telescoped in the portion 77 of the tube 76 to convey material from the container 85 to the aerating chamber 55. An opening 94 is provided in the rear wall of the appearance housing 16 to deposit the lower end 93 of the hose 92 when the dispenser 41 is disconnected.

When it is desired to employ the appliance to wax a floor, the container cap 87 is removed, suitable liquid wax is poured into the container 85 and the hose end 93 is removed from the opening 94 in the housing 16 and inserted into the upper portion 77 of the tube 76. The motor 14 is energized to rotate the motor ventilating fan 30 and the brushes 22, the latter engaging the surface 60 which is to be treated with the liquid wax. The fan 30 draws air from the atmosphere through the appearance housing inlet 39, and the motor casing 15 to cool the motor 14. The fan 30 expels the motor cooling air in an air stream through the air passageway 32 in the body section 12 and thence through the motor exhaust outlet 37 into the air passageway 75 in the body section 11 as indicated by the arrows 40. The air stream in the air passageway 75 then flows through the restricted area 82 which increases the velocity of the air stream as it passes beneath the outlet 96 of the tube 76 and through the entrance 56 into the aerating chamber 55.

The operator then places a finger in the ring 91 and pulls the cord 89 to open the valve 88 whereby the wax flows through the hose 92 into the upper end 77 of the tube 76 and the wax is expelled in drops 97 from the lower end 96 of the tube 76. The air stream contacts the drops 97 as they descend through the entrance 56 into the chamber 55 and also contacts the wax on the apertured opening 58, whereby air penetrates the globules of wax to aerate the latter and cause it to assume a foamy condition prior to discharge by gravity through the opening 58 onto the surface 60 which is to be treated.

The foamy condition of the dispensed wax is indicated at 98 and is clearly visible as it settles onto the surface 60 so that the operator is aware of the distribution of wax on the surface 60. During the discharge of foamy wax a forward and rearward force is applied to the handle 17 to reciprocate the rotating brushes 22 over the applied wax to thereby distribute and spread the wax evenly over the surface 60. When the operator releases the cord 89 the valve 88 closes to interrupt flow of wax to the aerating chamber 55.

Part of the air stream in the air passageway 75 escapes through the opening 83, whereby in the event the wax should clog the opening 58 escape of air in the passageways 32 and 75 is assured to prevent overheating of the motor 14.

The discharge opening 58 is uncovered to allow immediate discharge of the wax by action of gravity and also to prohibit accumulation of aerated wax in the chamber 55 so that upon closing the valve 88 the aerated wax remaining in the chamber 55 to be distributed is at a minimum.

The restricted area 82 in the air passageway 75 increases the velocity of the air in the air stream so that the wax is more thoroughly aerated to produce a more foamy mixture than if the restriction had been omitted.

The appliance may also be used to aerate other materials such as a detergent which is placed in the container 85 and conveyed to the chamber 55 as above described to aerate the detergent into a foamy mixture prior to application to a surface to be cleaned such as a floor or rug.

After application of the wax the hose end 93 is disconnected from the tube 76 and inserted in the opening 94 in the appearance housing 16 to store the hose until its use is again required. The dispenser 41 is disconnected from the body portion 12 by exerting a rearward pull on the body portion 11 to disengage the lugs 101 from the recesses 102 whereby the arms 100 are removed from the air passageway 32 and the motor cooling air from the motor 14 is discharged from the outlet 37 directly to the atmosphere. The appliance can then be employed without the application of wax or detergent and the brushes 22 engage the surface 60 to polish the applied wax, scrub a floor or clean a carpeted area to which the necessary material has been applied.

In order to attach the dispenser 41 to the front body portion 12 the arms 100 are inserted through the exhaust air outlet 37 into the air passageway 32 until the lugs 101 seat in the recesses 102 at which time the edge 62 of the rib 61 abuts the furniture guard 27 to rigidly secure the dispenser 41 to the front body portion 12.

While I have shown and described but one embodiment of my invention, it is to be understood that this embodiment is to be taken as illustrative only and not in a limiting sense. I do not wish to be limited to the particular structure shown and described but to include all equivalent variations except as limited by the scope of the claims.

I claim:

1. A dispenser for applying a material to a surface to treat the latter and adapted to be removably attached to an ambulatory appliance of the type having a motor driven surface engaging member, an outlet for escape of an air stream provided by a fan, and a container for storing the treating material having a discharge passageway for the material, comprising: a dispenser body having an aerating chamber, means communicating with said aerating chamber and connectible with the discharge passageway of the container for delivering the material to said aerating chamber, a cover for said aerating chamber, said cover movably mounted with respect to said aerating chamber to uncover the latter for access thereto, means including said cover defining an air passageway completely in said body independent of the appliance and having an inlet connectible with the appliance air outlet for conducting the appliance air stream to said chamber to aerate the material conveyed to said chamber, means defining an opening for discharging the aerated material from said chamber onto the surface to be treated, and means for removably attaching the dispenser to the appliance with said air passageway inlet connected to the appliance air outlet.

2. A dispenser for applying a material to a surface to treat the latter and adapted to be removably attached to an ambulatory appliance of the type having a motor driven surface engaging member, an outlet for escape of an air stream provided by a fan, and a container for storing the treating material having a discharge passageway for the material, comprising: a dispenser body having an aerating chamber, a cover for said aerating chamber, said cover movably mounted with respect to said aerating chamber to uncover the latter for access thereto, tubular means on said cover communicating with said aerating chamber and connectible with the discharge passageway of the container for delivering the material to said aerating chamber, means defining an air passageway completely in said body independently of the appliance and having an inlet connectible with the appliance air outlet for conducting the appliance air stream to said chamber to aerate the material conveyed to said chamber from the container, means defining an opening for discharging the aerated material from said chamber onto the surface to be treated, and means for removably attaching the dispenser to the appliance with said air passageway inlet connected with the appliance air outlet.

3. In a surface treating appliance, a body, a surface engaging member movably mounted on said body, a motor for driving said member and having an air exhaust outlet, fan means operated by said motor to provide an air stream for cooling said motor and passing through said exhaust outlet, a container mounted on said body for storing material to treat the surface, means defining an aerating chamber, means conveying the material from said container to said aerating chamber, a cover for said aerating chamber, said cover movably mounted with respect to said aerating chamber to uncover the latter for access thereto, conduit means including said cover conducting said air stream from said exhaust outlet to said chamber for aerating the material conveyed to said chamber from said container, and means defining an opening for discharging the aerated material from said chamber onto the surface to be treated.

References Cited

UNITED STATES PATENTS

| | | | |
|---|---|---|---|
| 3,218,657 | 11/1965 | Jepson | 15—50 |
| 3,258,803 | 7/1966 | Wolter et al. | 15—50 |

FOREIGN PATENTS

| | | |
|---|---|---|
| 210,361 | 9/1957 | Australia. |

ROBERT W. MICHELL, *Primary Examiner.*